A. BALLOCO.
SERVICE MOTOR OPERATED BY LIQUID FOR CONTROLLING MECHANISMS.
APPLICATION FILED SEPT. 9, 1911.
1,047,146. Patented Dec. 17, 1912.
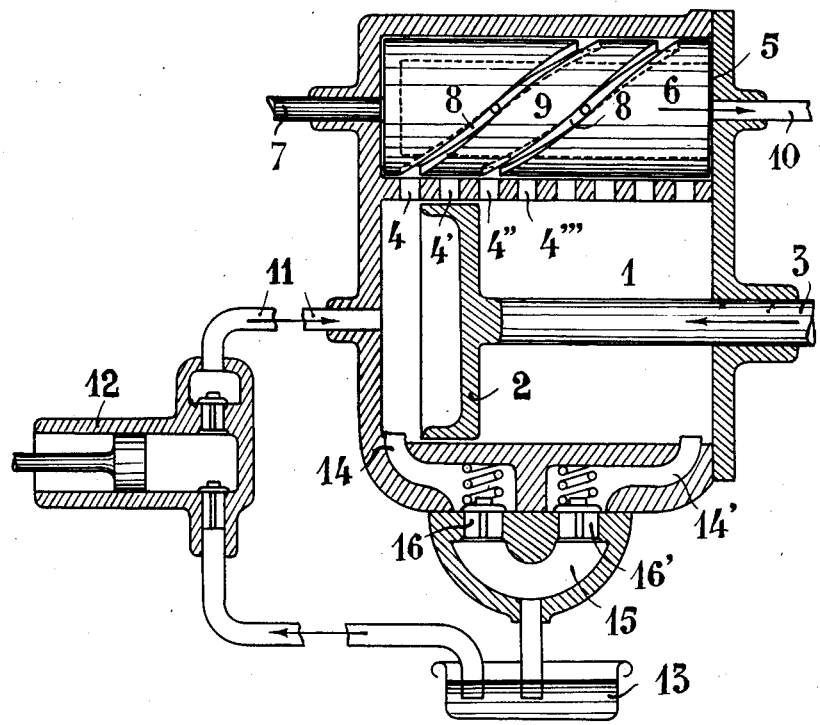
Witnesses:
F. H. Logan.
Alfred R. Anderson
Inventor
ALBERTO BALLOCO
By Frau Oldennel
Attorney

UNITED STATES PATENT OFFICE.

ALBERTO BALLOCO, OF TURIN, ITALY.

SERVICE-MOTOR OPERATED BY LIQUID FOR CONTROLLING MECHANISMS.

1,047,146.     Specification of Letters Patent.     Patented Dec. 17, 1912.

Application filed September 9, 1911. Serial No. 648,505.

*To all whom it may concern:*

Be it known that I, ALBERTO BALLOCO, residing at Turin, Italy, have invented certain new and useful Improvements in Service-Motors Operated by Liquid for Controlling Mechanisms, of which the following is a specification.

This invention relates to a service motor operated by a liquid for controlling mechanisms ordinarily maintained in a certain position by their inertia, by action of external forces, as springs, pressure, weight, or the like, or by their resistance to the motion.

In the accompanying drawing is shown an example of the invention in which the part of the mechanism to be controlled is constantly pushed in one direction by an external force.

As shown in the drawing the apparatus comprises a cylinder 1 in which slides a piston 2 whereof the rod 3 is connected with the part to be controlled, which part is continuously pushed by an external force in the direction of the arrow.

The cylinder 1 has arranged on a generatrix ports 4, 4', 4'', 4''', . . . at equal distances apart; through these there is communication between the interior of the cylinder and that of another adjacent cylinder 5. In the latter is a hollow cylindrical slide 6, adapted to turn on its axis and operated by the shaft 7. This cylindrical slide has on its surface two parallel helical grooves 8 of long pitch and communicating with the interior of the slide through perforations 9. Pipe 10 serves for passage of liquid from the interior of the slide 6. Into the end of the cylinder 1 opens the pipe 11 through which liquid is forced by a pump 12 or by any other suitable device, the liquid being drawn from the reservoir 13. Each end of the cylinder 1 is also in communication with the reservoir 13 through pipes 14, 14' respectively and chamber 15. The communication between the pipes 14 14' and the chamber 15 is controlled by spring valves 16 16' respectively so that piston 2 can draw liquid into the cylinder when it is displaced rapidly by application of external forces.

The depth of the piston 1 is equal to the distance between the two grooves 8 measured on the generatrix of the cylinder and this distance should be such that the two grooves register at the same time with two ports 4.

The operation of the apparatus is as follows:—If the pressure of the liquid continuously forced into the cylinder 1 through pipe 11 balances the force tending to push the piston rod 3 in the direction of the arrow, as may be supposed to be the case for instance in the figure, the liquid can pass freely through the port 4 and consequently through grooves 8 and perforation 9 into the hollow slide 6. If it is desired to displace the part which is being controlled against the action of the force which pushes it in the direction of the arrow, it suffices to turn the slide 6 so that the grooves 8 register with ports 4' and 4'''; then as the liquid under pressure cannot escape it pushes the piston toward the right and liquid, if there be any, on the other side of the piston is forced through port 4''' and the corresponding groove. The movement of the piston stops when port 4' has been uncovered to an extent such that the pressure existing on the face of the piston suffices merely to balance the force acting on the part to be controlled. Even should this force cease to act the piston cannot continue to move, for scarcely has the port 4' been completely uncovered when the port 4''' on the other side of the piston begins to close, so that the piston is brought to rest by reason of the increasing resistance of the liquid behind it, the passage for which through port 4''' becomes more and more throttled. It will be seen that in this manner by turning the slide 6, it is possible to secure the gradual advance of the piston 2 in the direction opposite to that indicated by the arrow. To allow displacement in the direction indicated by the arrow under action of the external force acting on the part to be controlled, the slide is turned in the opposite direction, for instance it may be returned into the position shown in figure. The port 4 being completely uncovered, the pressure on the left-hand face of the piston diminishes until the latter has moved far enough to cover port 4 to an extent which reëstablishes the equilibrium.

The arrangement of the pipes 14, 14' separated by the valves 16, 16' from the chamber 15 which communicates with the reservoir 13 has for its object to permit the introduction of a supplementary supply of liquid into the cylinder at both sides of the piston. Thus during a rapid movement toward the left, of the piston 2, caused by rotation of the slide so as to place two of the openings 4, 4' 4'' nearer the left-hand side in communication with the discharge, in the right hand chamber of the cylinder there is a partial vacuum, and a quantity of liquid is introduced into this chamber through the pipe 14'. Similarly, during a rapid movement of the piston 2 toward the right, there is supplied, if necessary, a supplementary amount of liquid through the pipe 14 in such manner as to insure that the left hand chamber is always filled with liquid. Naturally, these sudden movements of the piston 2 can take place only when one or other of the chambers of the cylinder is empty, as in this case there is no braking action of the liquid being discharged slowly through the communication established by the slide, or there is no discharge at all, and the resistance opposing the compression of the air contained therein is not sufficient to arrest the piston. It is therefore necessary that the two chambers of the cylinder should always be maintained filled with liquid, and with this object in view, at the commencement of the operation, or if by chance the cylinder is emptied, sudden movement of the piston 2 can be produced by hand by acting directly on the rod 3. Then the piston operates as a pump and draws liquid into the cylinder through the pipe 14 or 14' according to the direction of movement. For example, the right hand chamber of the cylinder might be emptied; this cannot prevent the apparatus of the type shown from operating because the external force acting on the rod 3 tends to thrust the piston 2 toward the left, but it is nevertheless important to fill this space with liquid, so that if the external force acting on the rod 3 should suddenly diminish, the piston will be prevented from moving suddenly toward the right. The piston 2 is then moved against the right hand wall of the cylinder by acting on the rod 3 in a direction contrary to that of the force. During this movement the air compressed in the interior of the right hand chamber, if the latter is not in communication with the exhaust, offers practically no resistance and in any case may discharge through clearances or by establishing communication with the exhaust. By thrusting the piston suddenly toward the left it acts as the piston of a pump and draws the liquid through the pipe 14' while the liquid in the other chamber is discharged through the outlet openings. Similarly, the liquid in the receptacle 13 is drawn into the left hand chamber of the cylinder if the piston 2 is moved suddenly toward the right; it is sufficient in general that the chamber which it is not necessary to fill with liquid should be in communication with the exhaust to permit outflow of the liquid contained therein.

It will be understood that when the two chambers of the cylinder are filled with liquid the piston can only be moved to take a position between the openings 4, 4' 4'', etc., in register with the passages 8 of the slide 6.

What I claim as my invention and desire to secure by United States Letters Patent is:—

1. In a liquid operated service motor for controlling mechanisms, a cylinder into which liquid is continuously forced under pressure, a piston sliding in said cylinder and connected to the mechanism to be controlled, a series of ports in the wall of said cylinder arranged on a generatrix at equal distances apart, a cylindrical cavity in correspondence with said series of ports in which a hollow cylindrical distribution slide is mounted to turn, two helical grooves in said slide arranged at an axial distance from each other so that the two grooves register at the same time with two ports and two holes by means of which said grooves communicate with the interior of the slide for discharging the liquid under pressure.

2. In a liquid operated service motor for controlling mechanisms, a cylinder into which liquid is continuously forced under pressure, a series of ports in the wall of said cylinder arranged on a generatrix at equal distances apart, a cylindrical cavity in correspondence with said series of ports in which a hollow cylindrical distribution slide is mounted to turn; two helical grooves in said slide arranged at an axial distance from each other so that the two grooves register at the same time with two ports, two holes by means of which said grooves communicate with the interior of the slide for discharging the liquid under pressure and a piston sliding in the cylinder and connected to the mechanism to be controlled, said piston having a depth equal to the distance between the near edges of the helical grooves.

3. In a liquid operated service motor for controlling mechanisms, a cylinder into which liquid is continuously forced under pressure, a piston sliding in said cylinder and connected to the mechanism, a series of ports in the wall of said cylinder arranged on a generatrix at equal distances apart; a cylindrical cavity in correspondence with said series of ports in which a hollow cylindrical distribution slide operated from outside is mounted to turn; two helical grooves in said slide arranged at an axial distance from each other so that the two grooves register at the same time with two ports, two holes by means of which said grooves communicate with the interior of the slide for discharging the liquid under pressure and two passages provided with valves by means of which the two ends of the cylinder communicate with the reservoir for the liquid.

4. In a liquid operated service motor for controlling mechanisms, a cylinder into which liquid is continuously forced under pressure, means for forcing said liquid in said cylinder, a piston sliding in said cylinder and connected with the mechanism to be controlled, a series of ports in the wall of said cylinder arranged on a generatrix at equal distances apart; a cylindrical cavity in correspondence with said series of ports in which a hollow cylindrical distribution slide operated from outside is mounted to turn; two helical grooves in said slide arranged at an axial distance from each other so that the two grooves register at the same time with two ports, two holes by means of which said grooves communicate with the interior of the slide for discharging the liquid under pressure and two passages provided with valves by means of which the two ends of the cylinder communicate with the reservoir for the liquid.

In testimony whereof I affix my signature in presence of two witnesses.

ALBERTO BALLOCO.

Witnesses:
JOCELYN GOUBEYRAN,
CARLO TORBA FRY.